United States Patent Office 3,470,131
Patented Sept. 30, 1969

3,470,131
STABILIZED PIGMENTED POLYMERS
William Frederick Baitinger, Jr., Belle Mead, N.J., assignor to American Cyanamid Company, Stamford, Conn., a corporation of Maine
No Drawing. Continuation-in-part of application Ser. No. 490,055, Sept. 24, 1965. This application Jan. 8, 1969, Ser. No. 789,961
Int. Cl. C08f *45/60, 45/04*
U.S. Cl. 260—41                                6 Claims

ABSTRACT OF THE DISCLOSURE

A light-stable polymeric composition comprising:
(a) a polymer selected from the group consisting of vinylchloride polymers, polyolefins derived from olefins of 2–4 carbon and polystyrene;
(b) at least 0.5% of $TiO_2$ pigment based on the weight of (a); and
(c) 0.1–10% based on the weight of (a) of a compound of the formula:

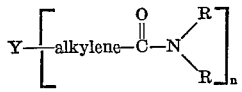

wherein alkylene has 1–3 carbons; each R is hydrogen or $R^1A$ in which $R^1$ is alkylene of 1–18 carbons and A is hydrogen, lower alkoxy, cyano, or hydroxy; Y is imino, N-alkylimino of 1–18 carbon atoms, thio or phosphinylidyne; and $n$ is an integer having a value of two when Y is imino, alkylimino or thio, or a value of three when Y is phosphinylidyne.

---

This application is a continuation-in-part of application Ser. No. 490,055, filed Sept. 24, 1965, now abandoned.

This invention relates to an improved means for stabilizing pigmented polymers against deterioration by light. More particularly, it relates to the provision of $TiO_2$-pigmented polymers stabilized with certain amides against light deterioration.

A variety of materials has been used for stabilizing polymers against discoloration by light. Ultraviolet absorbers have been found to improve light stability to varying degrees. Certain substrates are more successfully treated with U.V. absorbers than others. For example, plasticized polymeric compositions respond to certain stabilizers more favorably than do the same polymers in unplasticized compositions; but unplasticized polymers may be stabilized by a combination of U.V. absorbers with certain non-absorbing compounds. In some cases, U.V. absorbers may actually accelerate deterioration of the polymer. This is the case where a U.V. absorber per se is added to $TiO_3$-pigmented polymers such as rigid PVC. Thus, while there presently exists a wide array of light stabilizers, there are, nevertheless, many polymeric compositions, for example, pigmented polymers, for which adequate light stabilizing systems have not yet been provided. It is the object of the present invention to provide a new light stabilizer for $TiO_2$-pigmented polymers.

The present invention is based on the discovery that a class of compounds which are not per se light stabilizers, nonetheless act as light stabilizers for polymeric compositions which have been pigmented with titanium dioxide. The particular compounds are represented by the following Formula I:

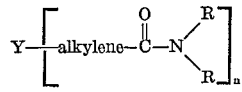

wherein alkylene has 1–3 carbons; $n$ is an integer having a value of 2 when Y is imino, alkylimino and thio and a value of 3 when Y is phosphinylidyne; each R is hydrogen or $R^1A$ in which $R^1$ is alkylene of 1–18 carbons and A is hydrogen, lower alkoxy, cyano, or hydroxy; and Y may be imino, N-alkylimino of 1 to 18 carbon atoms, thio and phosphinylidyne (P=O).

Examples of the compounds of Formula I which may be used are the following:

(1) Iminobis(alkanamides) such as: 3,3' - iminobis-(propionamide), 3,3' - imino[N - (2 - cyanoethyl)propionamide], 3,3' - iminobis(2 - methylpropionamide), 3,3'- iminobis(N - dodecylpropionamide), 3,3' - iminobis[N-(2 - hydroxyethyl)propionamide], 3,3' - iminobis[N,N-di-(2 - hydroxyethyl)propionamide], 3,3' - iminobis(N,N-dimethylpropionamide) and 2,2' - iminobisacetamide;

(2) 3,3' - lower alkyliminobis(alkanamides) such as 3,3' - methyliminobispriopionamide, 3,3' - butyliminobis-propionamide and 3,3' - methyliminobis(N - dodecylpropionamide);

(3) Thiobis(alkanamides) such as: 4,4' - thiobisbutyr-amide, 3,3' - thiobis(N - dodecylpropionamide), 3,3'-thio-bis[N - (2 - hydroxyethyl)propionamide], 3,3' - thiobis-[N,N - di(2 - hydroxyethyl)propionamide], 2,2' - thiobis-acetamide and 3,3' - thiobis(2-methylpropionamide); and (4) 3,3',3" - phosphinylidyne tris(propionamides) such as: 3,3',3" - phosphinylidyne tris(propionamide), 3,3',3"-phosphinylidynetris(N - dodecylpropionamide) and 3,3', 3" - phosphinylidynetris(N,N - dimethylpropionamide).

The results obtained with the present invention are most surprising since the compounds of Formula I alone in unpigmented polymers are not effective as light stabilizers. While titanium dioxide alone increases the light stability of various polymeric compositions, it was not expected that the addition of said compounds of the type described by Formula I should result in vastly improved light stability of the pigmented polymeric compositions.

To improve the light stability of pigmented polymers, it would normally be expected that known ultraviolet absorbers could be used. It is now found that ultraviolet absorbers can be dispensed with in the case of $TiO_2$-pigmented polymers and that the compounds of the above formula, in spite of their ineffectiveness in unpigmented polymeric compositions, are new, useful and economical light stabilizers in $TiO_2$-pigmented polymeric compositions.

The significance of the present invention is illustrated by the fact that conventional ultraviolet absorbers alone are not effective in stabilizing pigmented rigid poly-(vinyl chloride) better than the pigment, titanium dioxide, alone. Moreover, in some instances, they actually may accelerate degradation. Therefore the discovery of the described synergistic combination is most surprising and very useful.

The pigmented polymers ordinarily encountered and to which the present invention has been found to be effective include rigid and plasticized poly(vinyl chloride), polystyrenes, and polyolefins such as polyethylene and polypropylene. Other polymers in which the amides are soluble to the degree that they become effective, may also be used in this invention.

The polymeric compositions to be stabilized by the present invention should contain at least 0.5% of titanium dioxide, which may be of the rutile or anatase type, but preferably, is of the rutile type. The particle size range of the pigment is not particularly critical, but a practical particle size range is from 0.05 to 0.4 micron and preferably between about 0.15 and 0.3 micron. The concentration of titanium dioxide in the polymeric composition may range from 0.5 to 10.0% ore more, and preferably, is above 0.5% based on the weight of the polymer. The concentration of the compound of Formula I may vary from about 0.1 to about 10.0% and preferably is from about 0.25 to about 3.0% based on the weight of the polymer.

Other additives may be employed in preparing the final polymer for the intended application. Among such additives are fillers, antioxidants, antistatic agents, other pigments, dyes, lubricants, etc., and heat stabilizers.

The stabilized pigmented polymeric compositions of this invention have a wide variety of uses. They may be used effectively for various types of articles including molded products such as appliance cabinets, kitchen cabinets, soft drink cases, milk cases, packing frames, building construction materials, window frames, panels, outdoor siding, etc.; they may also be extruded to form films or filaments, the filaments being of use in fibers and fabrics for specialized uses as in bags, sails, etc.

The invention is further illustrated by the examples which follow:

In the following examples, light stability was determined by preparation of polymeric compositions and exposure to natural light and artificial light in test equipment such as the FS-BL Unit (Fluorescent Sunlamp-Blacklight Unit). The degree of degradation as shown by color formation is expressed by $\Delta$YI (Yellow Index change). The determination is made with the use of a differential colorimeter (Colormaster). The FS-BL results are reported as the number of hours to reach a change in Yellow Index ($\Delta$YI) of 15 Units or the change in Yellow Index ($\Delta$YI) on exposure for 75 hours.

EXAMPLE 1

PVC samples were prepared from the following formulation:

| | Parts |
|---|---|
| Poly(vinyl chloride) | 100 |
| TiO$_2$ | 2 |
| Organo-tin-mercaptide heat stabilizer (Thermolite 31) [1] | 2 |
| Stearic acid | 0.5 |

[1] A commercially available di-n-butyl tin bis(isooctyl mercapto acetate).

Pre-blending of 100 gram quantities was accomplished by roll-mixing the above formulation overnight. Samples for exposure were prepared by adding a suitable quantity of additive, where desired, and milling on a two-roll laboratory mill for five minutes at 170° C., followed by compression-molding at 180° C. to give 50-mil plaques. Results obtained are given below:

TABLE I.—FS-BL EXPOSURE OF TiO$_2$-PIGMENTED PVC

| Run | Test No. | Additive (1%) | Initial Y.I. | Time (hrs.) to $\Delta$Y.I.=15 |
|---|---|---|---|---|
| A | 1 | None (control) | 2 | 390 |
|   | 2 | 3,3',3''-phosphinylidynetris-propionamide. | 2 | 470 |
| B | 3 | None (control) | 2 | 400 |
|   | 4 | 3,3'-thiobis-(N-dodecyl-propionamide). | 1 | 480 |

Other stable PVC compositions can be obtained by following the procedure of Example 1 except for the use of other compounds such as: N - methyliminobis(N-dodecylpropionamide), 3,3' - iminobis(N,N - dicyanoethylpropionamide) and 3,3' - iminobis(N,N - di(hydroxyethyl)propionamide).

EXAMPLE 2

Four PVC films were prepared without any heat stabilizer present. One film was utilized as a control and had no additive present. A second film, also utilized as a control, contained 2.0% of TiO$_2$ only. The third film contained 1.0% of Additive A (3,3',3'''-phosphinylidyne trispropionamide) only. The fourth film (in accordance with the present invention) contained 2.0% of TiO$_2$ plus 1.0% of Additive A. Each film was compression molded directly from the homopolymer powder (after dry blending a portion of the powder with the appropriate additive or additives where used). The four films were then exposed to ultraviolet light using a Fluorescent Sunlamp-Blacklight (FS-BL) lamp for 75 hours and the change in yellow index was measured using a differential colorimeter ("Colormaster"). The results are shown below in Table II.

TABLE II

| Description | Initial Y.I. | $\Delta$Y.I. on exposure for 75 hours |
|---|---|---|
| Control, no additive | 4+ | 36 |
| PVC+2.0% TiO$_2$ | 6 | 11 |
| PVC+1.0% additive A | 4 | 36 |
| PVC+2.0% additive TiO$_2$+1.0% additive A | 8 | 6 |

This example shows that, in the absence of a heat stabilizer, the amide alone produced no light stabilizing effect but that, when used in combination with TiO$_2$ the greatly enhanced light stabilizing effect of the present invention was obtained.

In total, these examples clearly demonstrate the beneficial light stabilizing effect of the stabilizer combinations of the present invention in the presence of and in the absence of heat stabilizers. Similarly, other TiO$_2$-pigmented polyethylene and TiO$_2$-pigmented polypropylene, are given enhanced light stability when treated in accordance with the present invention.

I claim:
1. A light-stable polymeric composition comprising:
   (a) a polymer selected from the group consisting of vinyl chloride polymers, polyolefins derived from olefins of 2–4 carbons and polystyrene;
   (b) at least 0.5% of TiO$_2$-pigment based on the weight of (a); and
   (c) 0.1–10% based on the weight of (a) of a compound of the formula:

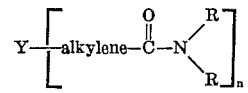

wherein alkylene has 1–3 carbons; each R is hydrogen or R$^1$A in which R$^1$ is alkylene of 1–18 carbons and A is hydrogen, lower alkoxy, cyano, or hydroxy; Y is imino, N-alkylimino of 1–18 carbon atoms, thio or phosphinylidyne; and $n$ is an integer having a value of two when Y is imino, alkylimino or thio, or a value of three when Y is phosphinylidyne.

2. The composition of claim 1 wherein the polymer is poly(vinyl chloride).

3. The composition of claim 1 wherein the compound is 3,3',3''-phosphinylidynetris(propionamide).

4. The composition of claim 2 wherein there is an effective amount of a heat stabilizer.

5. The composition of claim 4 wherein the heat stabilizer is an organo-tin-mercaptide.

6. The composition of claim 4 containing about two weight parts of heat stabilizer per 100 parts of polymer.

References Cited

UNITED STATES PATENTS 2,648,650  8/1953  Weinberg et al. _____ 260—30.6
2,921,048  1/1960  Bell et al. _____ 260—45.9

MORRIS LIEBMAN, Primary Examiner

J. H. DERRINGTON, Assistant Examiner

U.S. Cl. X.R.

260—45.9, 45.75